(12) United States Patent
Kim

(10) Patent No.: US 7,614,804 B2
(45) Date of Patent: Nov. 10, 2009

(54) SECURITY CAMERA

(75) Inventor: Young Sang Kim, Kwachon (KR)

(73) Assignee: Nuvico, Inc., Englewood, NJ (US)

( * ) Notice: Subject to any disclaimer, the term of this patent is extended or adjusted under 35 U.S.C. 154(b) by 391 days.

(21) Appl. No.: 11/511,989

(22) Filed: Aug. 29, 2006

(65) Prior Publication Data

US 2008/0056708 A1    Mar. 6, 2008

(51) Int. Cl.
*G03B 17/00* (2006.01)
*H04N 5/225* (2006.01)

(52) U.S. Cl. ........................ 396/427; 348/373

(58) Field of Classification Search ................ 396/419, 396/427; 348/208.3, 151, 373, 375
See application file for complete search history.

(56) References Cited

U.S. PATENT DOCUMENTS 6,268,882 B1 *  7/2001  Elberbaum .................. 348/151

2007/0126872 A1 *  6/2007  Bolotine et al. ............. 348/151

* cited by examiner

*Primary Examiner*—Melissa J Koval
*Assistant Examiner*—Autumn Parker
(74) *Attorney, Agent, or Firm*—Day Pitney LLP

(57) ABSTRACT

A security camera includes a base and a cover having a clear transparent dome. A gimbal base is mounted on the base and is tiltable with respect to a first axis parallel to said base substantially through a 90° angle. The gimbal base is also rotatable through an angle of at least 360° about a second axis perpendicular to the base. A camera module holder/bracket is attached within the gimbal base, and a camera module attached to the holder/bracket. The camera module holder/bracket enables the position of the camera module to be adjusted along a third axis perpendicular to the gimbal base. A gimbal cover, having a hole for the camera lens, covers the gimbal base. Together, the gimbal cover and gimbal base completely enclose the camera module.

7 Claims, 7 Drawing Sheets

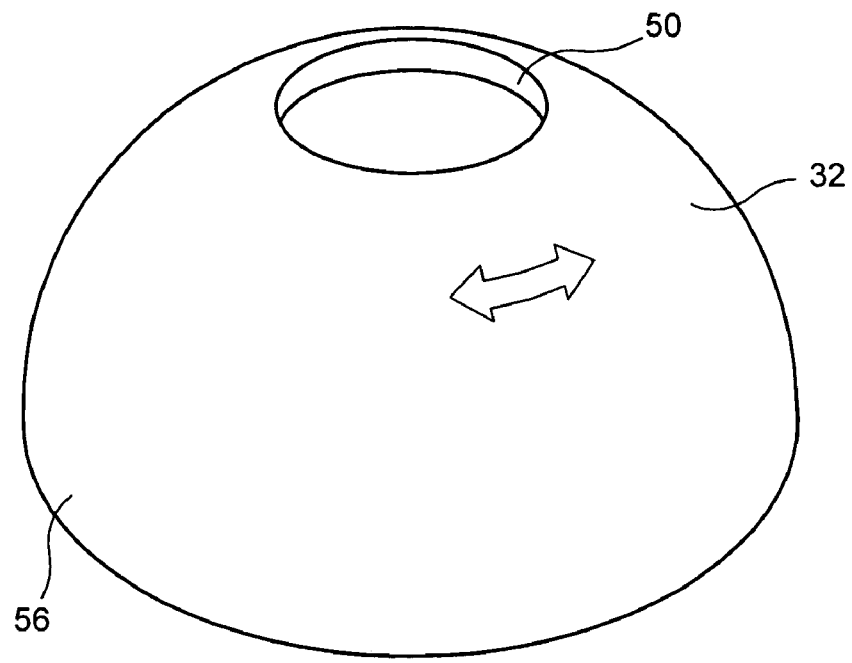
F I G. 10
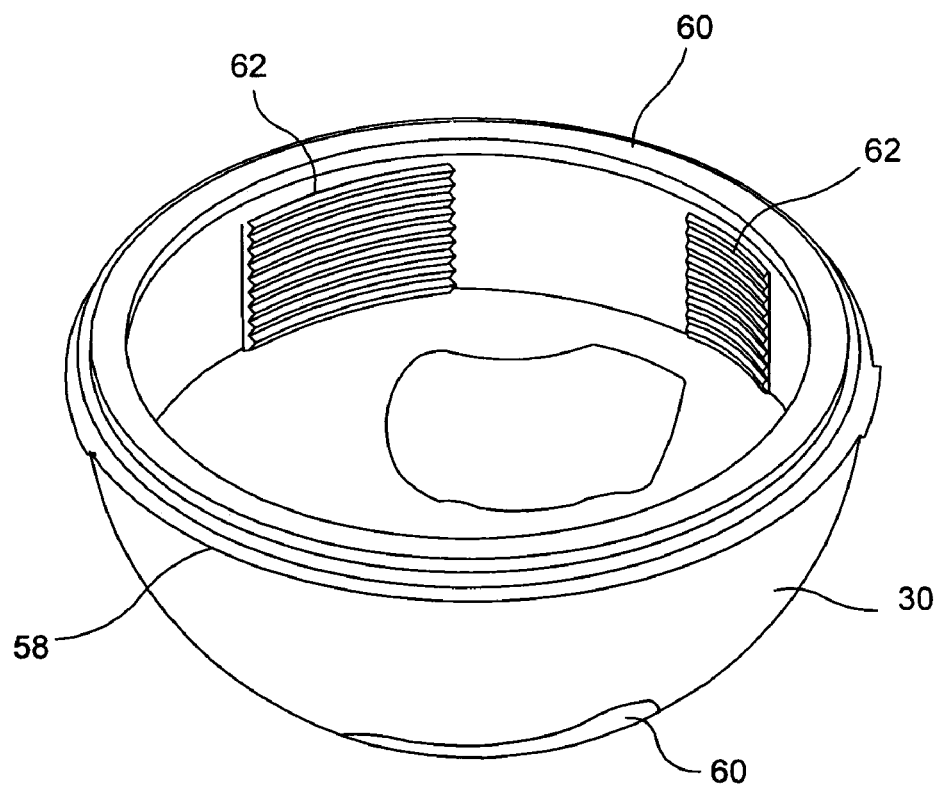
F I G. 11

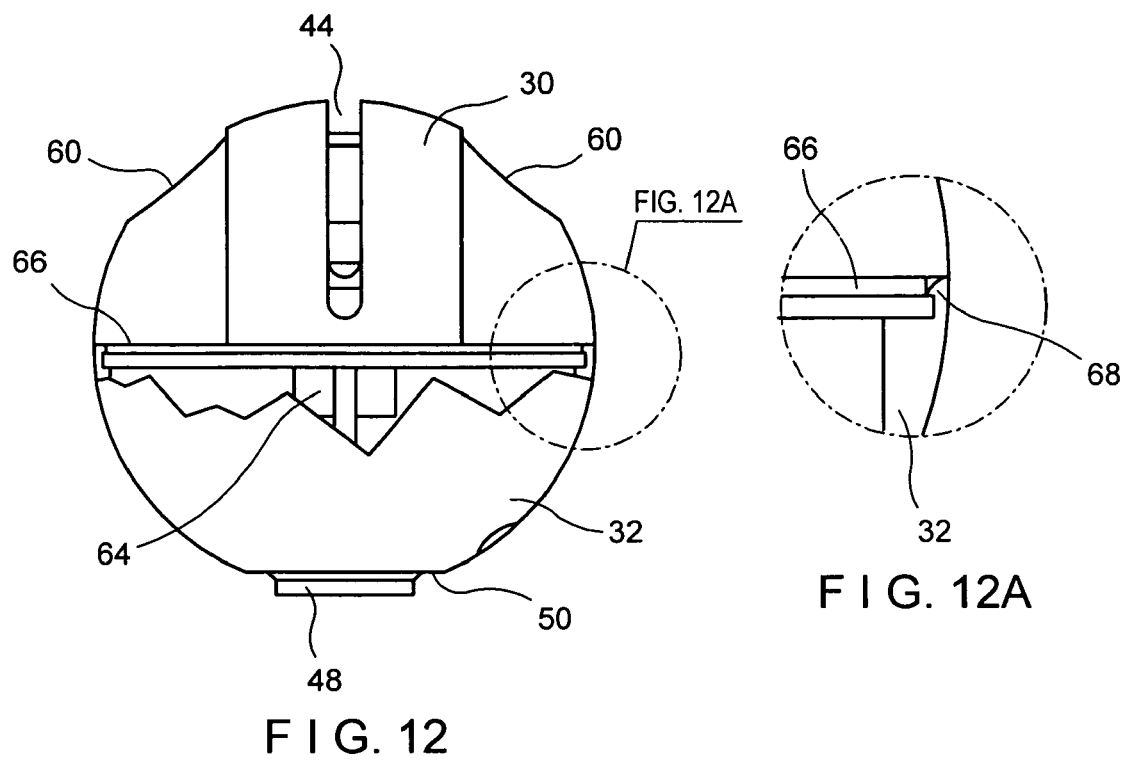
F I G. 12
F I G. 12A
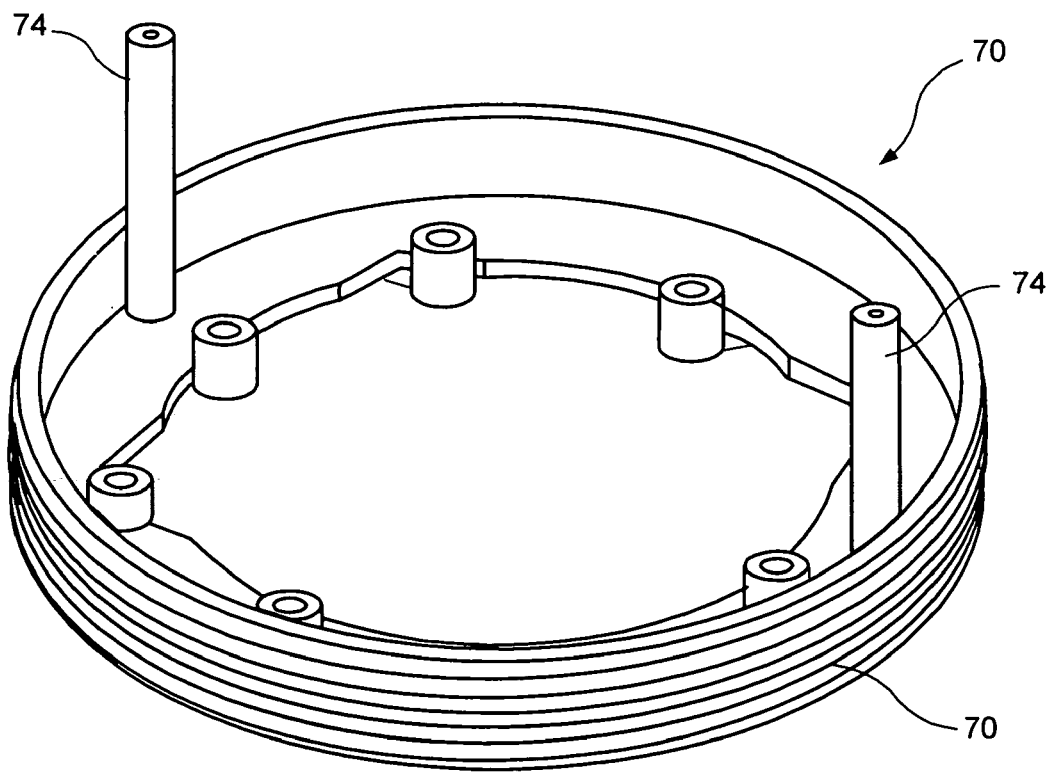
F I G. 13

SECURITY CAMERA

BACKGROUND OF THE INVENTION

1. Field of the Invention

The present invention relates to security cameras which are mounted on ceilings or walls for surveillance purposes.

2. Description of the Related Art

Security cameras of the subject type are extremely well known in the art. Indeed, cameras of this type have become virtually ubiquitous as the need for security, particularly in public and commercial establishments, has grown in recent years.

Two deficiencies in security cameras heretofore available have motivated the invention of the present security camera. Firstly, because of the manner in which the camera modules in prior art security cameras have been mounted, they are severely limited in the amount they may be tilted, such that they can be tilted to at most an angle of about 65°. This severely limits the potential coverage of a security camera from a particular mounting position.

Secondly, camera modules of the prior art security cameras have generally been aimed to take in the area to be placed under surveillance. Then, a separate dome liner is fitted into the dome portion of the cover of the security camera to make it difficult for one in the vicinity from determining the exact direction in which the camera is pointed and to reduce reflections. Such dome liners are imperfect in that they are provided in one type intended to be used in all tilt orientations of the camera module, namely, they have a gap which runs from the top to the edge of the liner. Of course, this readily enables one to determine which way the camera is pointed and only partially reduces reflections.

These short comings are addressed and overcome by the security camera of the present invention.

SUMMARY OF THE INVENTION

Accordingly, the present invention is a security camera which has a base which is mounted, perhaps using a surface mounting plate, on a ceiling or high on a vertical wall. A gimbal base is attached to the base through a slot in the gimbal base which enables the gimbal base to be tilted about a first axis parallel to the base. The gimbal base is also rotatable about a second axis perpendicular to the base.

A camera module holder/bracket is threadingly attached within the gimbal base. A camera module is mounted on the holder bracket. Its position along a third axis perpendicular to the gimbal base is adjusted by rotating the holder/bracket within the gimbal base. The camera module is mounted so as to have a view in a direction parallel to the third axis.

A gimbal cover having a hole for the camera lens aligned with the third axis is attached to the gimbal base to enclose the camera module holder/bracket and camera module completely within the gimbal base and gimbal cover.

The present invention will now be described in more complete detail with frequent reference being made to the figures identified below.

BRIEF DESCRIPTION OF THE DRAWINGS

FIG. 10 is a perspective view of a gimbal cover for the security camera;

FIG. 11 is a perspective view of a gimbal base for the security camera;

FIG. 12 is a plan, and partially cut-away view of the gimbal base and gimbal cover attached to one another;

FIG. 12A is an enlarged view of the circled area of FIG. 12;

FIG. 13 is a perspective view of a camera module holder/bracket for the security camera;

DETAILED DESCRIPTION OF THE PREFERRED EMBODIMENT

Figure 1:
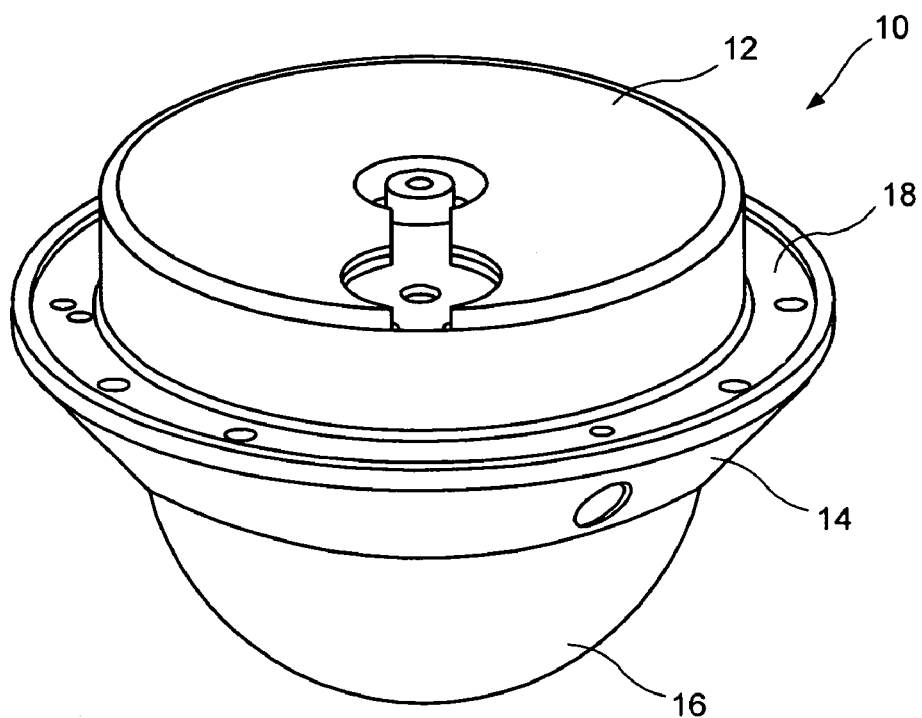
FIG. 1 is a perspective view of the security camera of the present invention.

Turning now to these figures in greater detail, FIG. 1 is a perspective view of the security camera 10 of the present invention. The security camera 10 includes a base 12 and a cover 14 which includes a transparent dome 16 through which a camera within views an area subject to surveillance for security purposes. The dome 16 is typically made from a high-impact clear plastic material. Opening 18 is provided for electrical conductors, not shown in FIG. 1, to pass from within the security camera 10 for connection and hook-up to circuitry in the building or other area to be observed.

Although referred to as base 12 of the security camera 10, the base 12 is most commonly mounted on a ceiling with the cover 14 and dome 16 oriented in a downward direction. Alternatively, the security camera 10 may be mounted high on a wall and out of easy reach of those in the building or area under surveillance. In such case, the base 12 is attached to the wall or other vertical surface, and the cover 14 and dome 16 are oriented outwardly from the wall.

Figure 2:
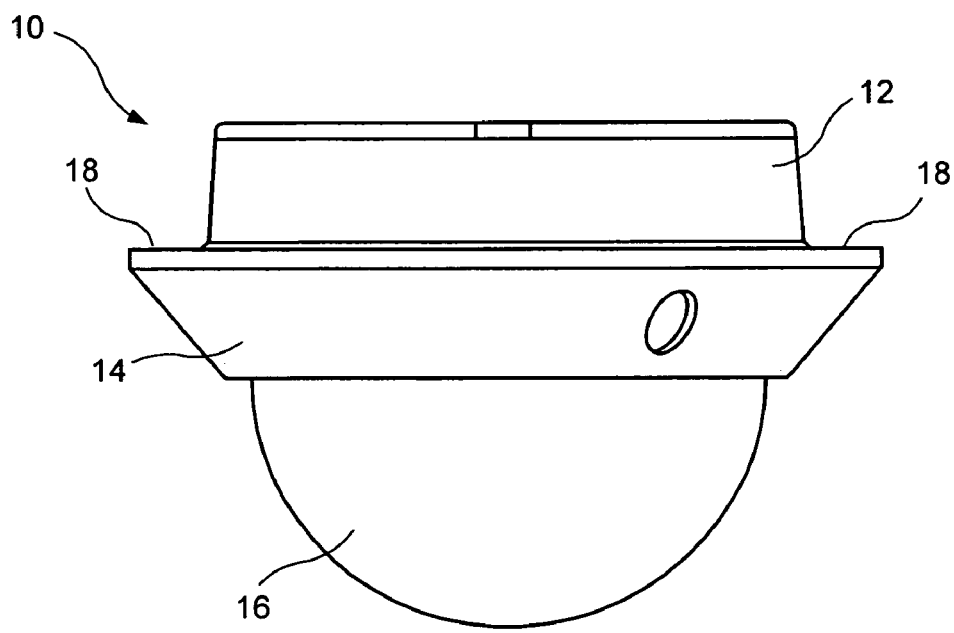
FIG. 2 is a side view of the security camera shown in FIG. 1.

FIG. 2 is a side view of the security camera 10 shown in FIG. 1. It will be observed in FIG. 2 that the base 12 and cover 14 form a shoulder 18 running circumferentially about the security camera 10. Shoulder 18 is useful when flush/mounting the security camera 10 in a ceiling or wall through a hole having a diameter less than that of the cover 14 but greater than that of the base 12.

Figure 3:
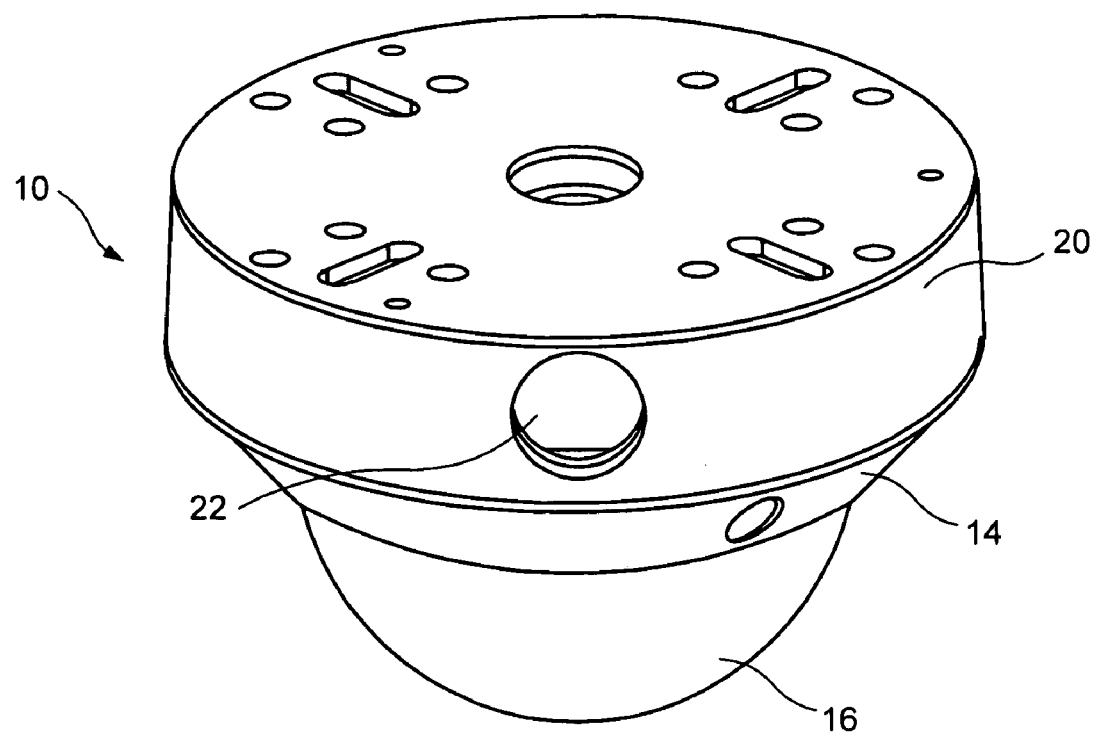
FIG. 3 is a perspective view of the security camera with a surface mounting plate.

FIG. 3 is a perspective view of the security camera 10 wherein a surface mounting plate 20 is provided for use in situations where flush mounting is not possible. In such situations, surface mounting plate 20 is first mounted on the surface, such as a ceiling or wall, on which the security camera 10 is to be deployed, then the base 12, not visible in FIG. 3, is mounted within the surface mounting plate 20.

Figure 4:
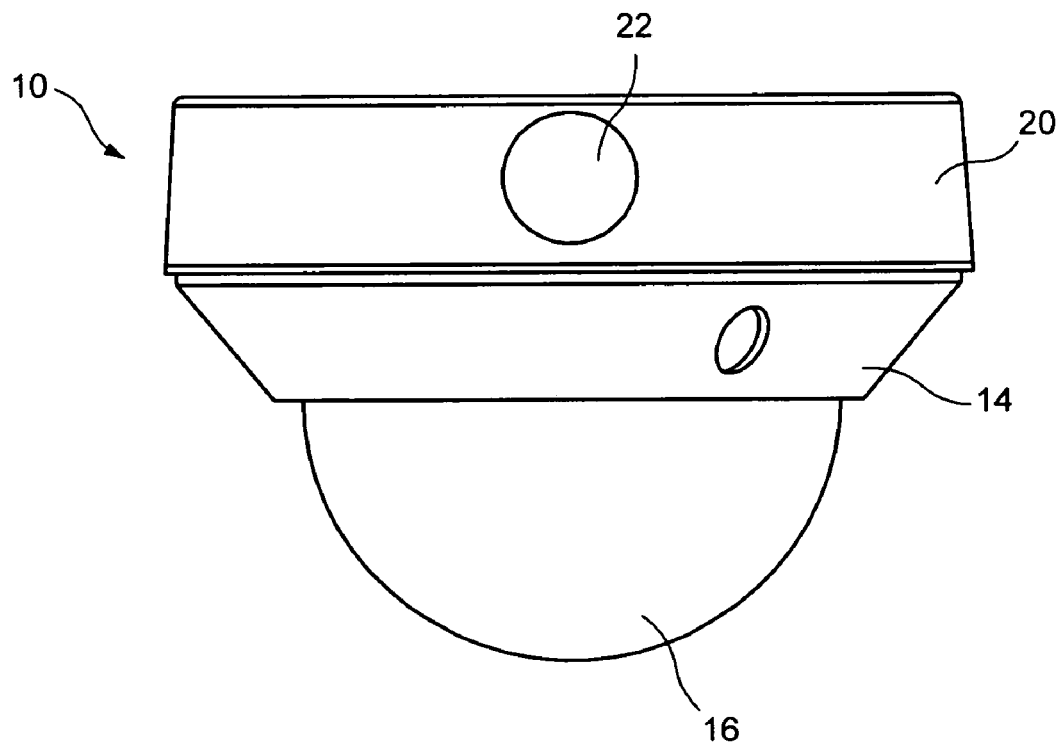
FIG. 4 is a side view of the security camera shown in FIG. 3.

FIG. 4 is a side view of the security camera 10 shown in FIG. 3. It will be noted that surface mounting plate 20 has a knock-out access hole 22 for electrical connections to be made to the security camera 10.

Figure 5:
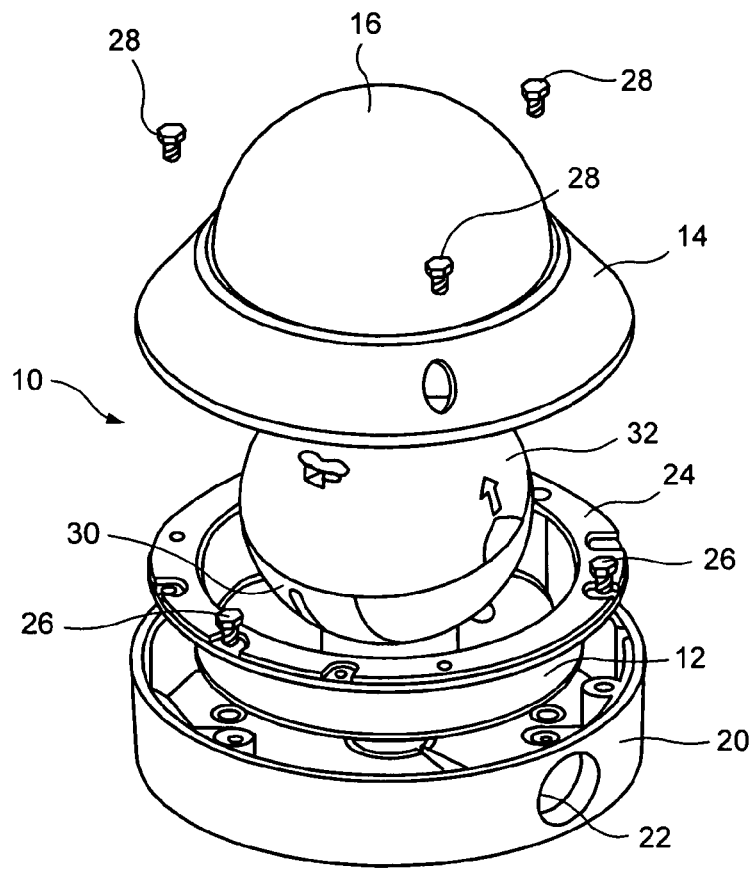
FIG. 5 is an exploded view of the security camera shown in FIGS. 3 and 4.

FIG. 5 is an exploded view of the security camera 10 shown in FIGS. 3 and 4 inverted relative thereto. It will be noted in FIG. 5 that shoulder 18 is primarily formed by flange 24 which extends radially outward from base 12. Flange 24 is provided with several holes so that screws 26 may be used to mount the base 12 to the surface mounting plate 20 where the latter is used. In any event, screws 28 are to secure cover 14 and dome 16 to base 12 about the flange 24.

Within the security camera 10 as shown in the exploded view of FIG. 5 are a gimbal base 30 and gimbal cover 32. As will be discussed in greater detail below, the gimbal base 30 and gimbal cover 32 are snappingly attached to one another to form a housing for the actual camera for the security camera 10.

Figure 6:
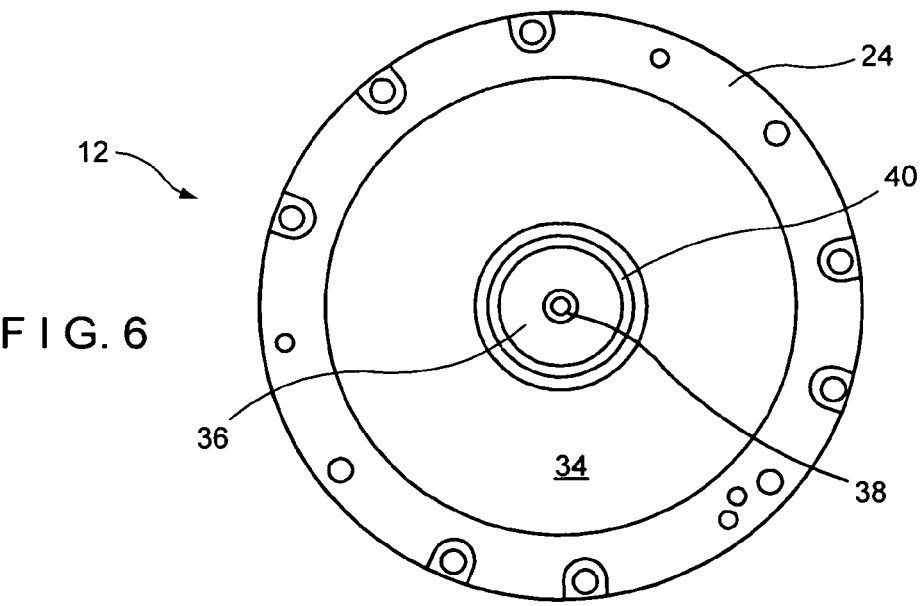
FIG. 6 is a plan view of the base of the security camera.

As implied in FIG. 5, the gimbal base 30 is mounted within base 12. FIG. 6 is a plan view of the base 12. The floor 34 of the base 12 is used to mount circuit boards, not shown in FIG. 6 and not required for a full discussion of the present invention. At the center of the floor 34 of the base 12, however, is a circular pedestal 36 on which the gimbal base 30 may be mounted. At the very center of pedestal is a threaded hole 38 into which a screw may be driven to secure the gimbal base 30 to the floor 34 of the base 12. Adjacent to the circumferential edge of the circular pedestal 36 is a resilient cushion 40 to protect the gimbal base 30 when the latter is tightly secured thereto.

Figure 7:
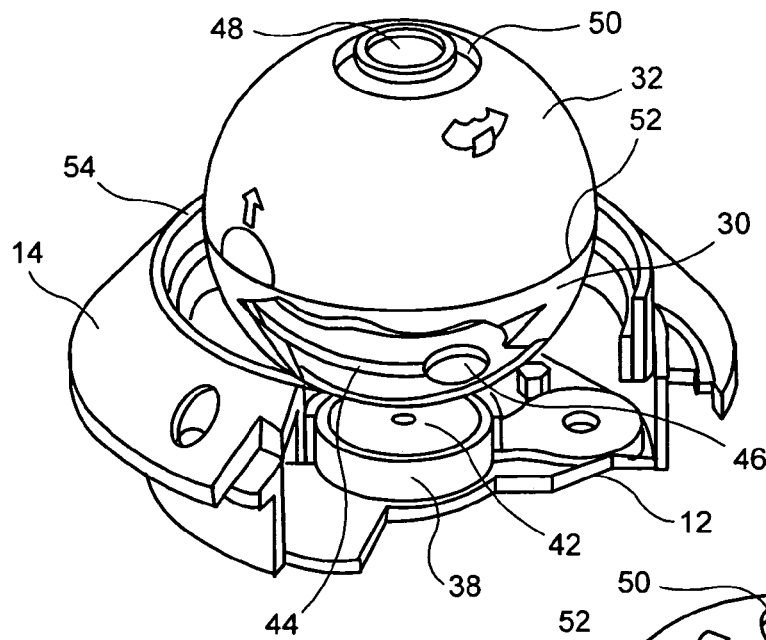
FIG. 7 is a partially cut-away and exploded view of the security camera.
Figure 8:
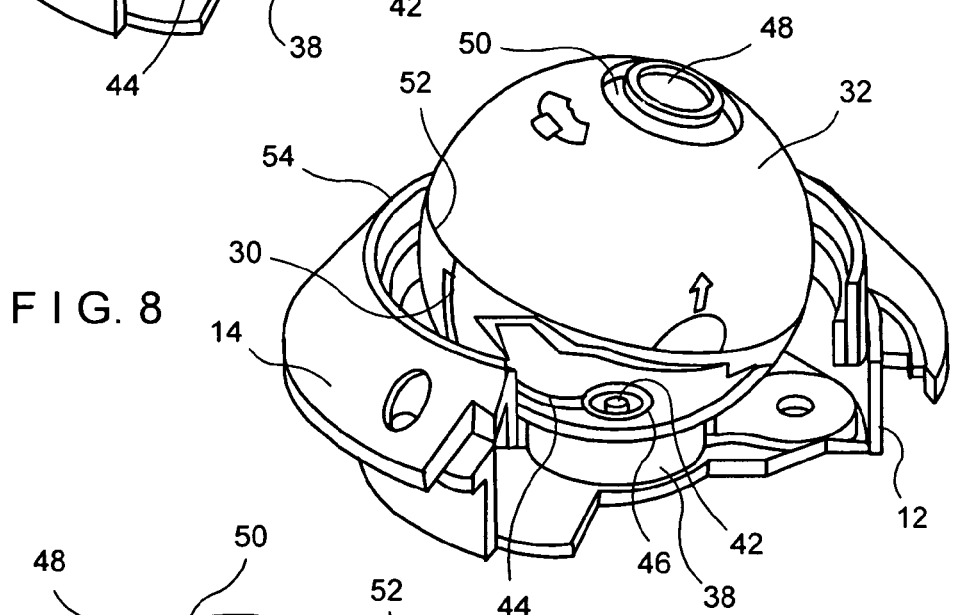
FIG. 8 is a view similar to that of FIG. 7.
Figure 9:
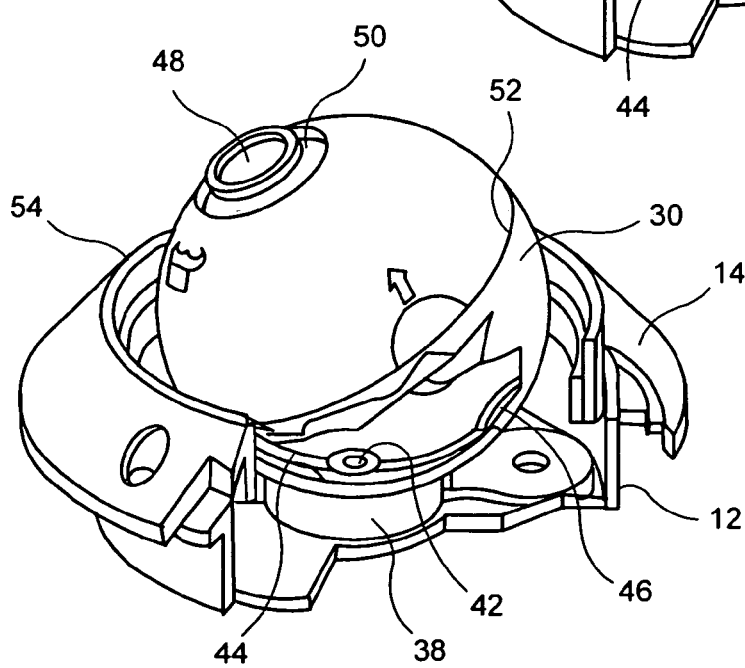
FIG. 9 is view similar to those of FIGS. 7 and 8.

Referring now to FIG. 7, a partially cut-away and exploded view of the base 12, cover 14, exclusive of dome 16, and gimbal base 30 and gimbal cover 32, a screw 42 is disposed in screw hole 38 in pedestal 36 to secure gimbal base 30 thereto. Gimbal base 30 is generally hemispherical in shape and has a slot 44 which runs from the bottom, or pole, of the hemisphere substantially to its equator. More specifically, the slot 44 runs for an arc of approximately 85° on the surface of the hemisphere formed by the gimbal base 30. Adjacent to the polar end of slot 44 is a hole 46 of diameter slightly greater than that of the head of screw 42. As shown in FIG. 8, the hole 46 is placed onto and over screw 42, and the gimbal base 30 is rotated so as to secure the gimbal base 30 to the pedestal 38 by means of screw 42 whose head is wider than slot 44, as shown in FIG. 9.

Referring again to FIGS. 7, 8 and 9, camera lens 48 views outwardly through hole 50 in gimbal cover 32. As was the case with gimbal base 30, gimbal cover 32 is also generally hemispherical in shape, hole 50 being at the pole opposite to that of the gimbal base 30, that pole being located at an end of slot 44 adjacent to hole 46. Together, then, gimbal base 30 and gimbal cover 32 form a sphere whose equator 52 is the joint therebetween. It will be apparent, particularly from FIG. 7, that the greater part of the sphere formed by gimbal base 30 and gimbal cover 32 extends beyond cover 14, exclusive of dome 16. As will be described below, the camera within the sphere formed by gimbal base 30 and gimbal cover 32 has a base mounted more or less at the center thereof. As a consequence, because slot 44 in gimbal base 30 extends for an arc of approximately 85°, the camera, which has a base mounted beyond rim 54, may be oriented azimuthally anywhere between 0°, or straight down when the security camera 10 is mounted on a ceiling, to almost 90°, or laterally outward, and has an unobstructed view anywhere in the range therebetween. This adjustment, known as the tilt, is made about an axis passing diametrically through the sphere formed by the gimbal base 30 and gimbal cover 32 and parallel to the floor 34 of base 12. This is the first of the three axes, relative to which the position of the camera may be varied, referred to above in the summary of the invention.

The second of the three axes extends perpendicularly from screw 42 which secures gimbal base 30 to pedestal 36 on floor 34 of base 12. Once the camera is oriented at the desired azimuthal, or tilt, angle, the gimbal base 30 and gimbal cover 32 may be rotated about the second axis by at least 360° to orient the camera lens 48 in a desired direction. This adjustment, known as the pan, may be limited by the amount of slack in any electrical connections running between the camera and circuit boards mounted on the floor 34 of base 12.

FIG. 10 is a perspective view of gimbal cover 32 showing hole 50 more clearly. On the edge of the gimbal cover 32 is a ridged area 56. There is another at a diametrically opposed location not shown in FIG. 10. One quarter of the circumference around the edge of the gimbal cover 32 from each of these ridged areas 56 are hooks, to be shown below, on the inner surface of the edge of the gimbal cover 32. When the gimbal cover 32 is manually squeezed at the ridged areas 56, it is deformed sufficiently so that the hooks release from a groove about the edge of the gimbal base 30 to permit the removal of the gimbal cover 32 therefrom.

FIG. 11 is a perspective view of gimbal base 30. At least three features are worthy of note. As indicated above, a groove 58 runs about the edge of the gimbal base 30 so that gimbal cover 32 may be attached thereto. Openings 60 are provided in gimbal base 30 for electrical connections running between the camera and circuit boards mounted on the floor 34 of base 12. Finally, and perhaps most importantly, threads 62 are provided within gimbal base 30 for positioning a camera module holder/bracket, to be described below, therein.

FIG. 12 is a plan, and partially cut away, view of the gimbal base 30 and gimbal cover 32 attached to one another. Camera 64 is partially seen through the portion of gimbal cover 32 that has been removed. Running around the edge of the gimbal base 30 is the groove 66 referred to above. FIG. 12A is an enlarged view of the portion of FIG. 12 within the dashed circle. There, hook 68 is engaged in groove 66 to secure gimbal cover 32 to gimbal base 30.

FIG. 13 is a perspective view of a camera module holder/bracket 70 of the present invention. The outer surface of camera module holder/bracket 70 has threads 72 so that holder/bracket 70 may be threadingly engaged with threads 62 in gimbal base 30.

Camera module holder/bracket 70 also has a pair of upstanding posts 74 in diametrically opposed positions adjacent to threads 72. Their purpose will be described below.

Figure 14:
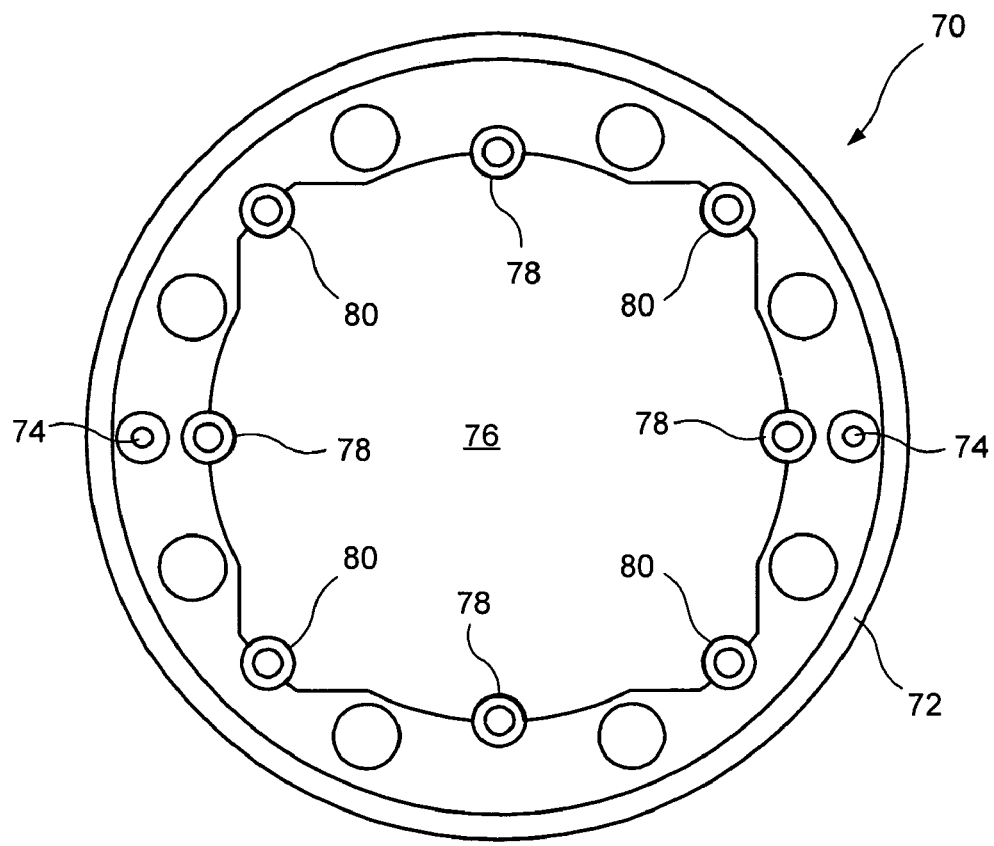
FIG. 14 is a plan view of the camera module holder/bracket.

FIG. 14 is a plan view of camera module holder/bracket 70. It will be noted that holder/bracket 70 has a central opening 76 about which are disposed holes 78, 80 in alternating positions. These holes 78, 80 are provided so that industry standard camera modules may be installed in holder/bracket 70. One set of holes 78 is used for 38×38 mm camera modules; the other set of holes 80 is used for 42×42 mm camera modules.

Figure 15:
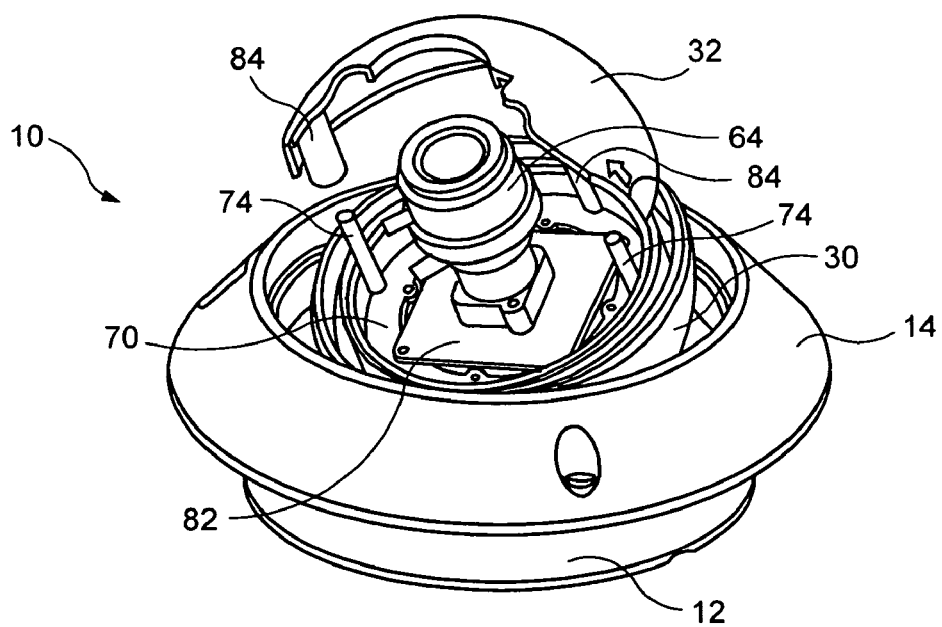
FIG. 15 is a partially exploded and cut-away perspective view of the security camera.

FIG. 15 is a perspective view of security camera 10, without dome 16, wherein gimbal cover 32 has been exploded from gimbal base 30 and partially cut away. Within gimbal base 30 is camera module holder/bracket 70 which is threadingly engaged therein. Camera 64 is part of a camera module which includes a camera base 82 having various electronic circuit elements not shown in FIG. 15. Holes 78 or holes 80 are used to mount camera base 82 to camera module holder/bracket 70. Upstanding posts 74 engage within sleeves 84 inside gimbal cover 32 when the latter is attached to gimbal base 30. This enables the user to turn to camera module holder/bracket 70 by turning the gimbal cover to make a final adjustment to the position of camera 64 along the axis of the sphere formed by the gimbal base 30 and gimbal cover 32, which axis is the third axis, relative to which the position of the camera 64 may be varied, as discussed above. This enables various types of fixed and vari-focal lenses to be used with camera 64, as the height of the camera module is adjustable by turning the camera module holder/bracket 70.

Modifications to the above would be obvious to those of ordinary skill in the art, but would not bring the invention so modified beyond the scope of the appended claims.

What is claimed is:

1. A security camera, said security camera comprising:
   a base for said security camera;
   a gimbal base attached to said base, said gimbal base being tiltable with respect to a first axis parallel to said base and rotatable about a second axis perpendicular to said base, said gimbal base having a hemispherical shape having a pole and an equatorial edge, said gimbal base further having a slot running from said pole substantially to said equatorial edge, said gimbal base being attached to said base through said slot so that said gimbal base may be tilted relative to said base through an angle approaching 90° while remaining attached thereto;
   a camera module holder/bracket attached within said gimbal base and movable along a third axis perpendicular to said gimbal base;
   a camera module attached to said gimbal base, said camera module having a camera and a camera lens, said camera module being mounted on said camera module holder/bracket so that said camera lens has a view parallel to said third axis; and
   a gimbal cover, said gimbal cover having a hole for said camera lens, said hole being aligned with said third axis, said gimbal cover being attached to said gimbal base to enclose said camera module holder/bracket and camera module within said gimbal base and gimbal cover.

2. A security camera as claimed in claim 1 wherein said base has a pedestal for mounting said gimbal base thereon, said pedestal having a threaded hole for attaching said gimbal base thereto with a screw.

3. A security camera as claimed in claim 1 wherein said gimbal base and gimbal cover together have a spherical shape when attached to one another.

4. A security camera as claimed in claim 1 wherein said camera module holder/bracket is threadingly attached within said gimbal base and is moved along said third axis perpendicular to said gimbal base by rotating said camera module holder/bracket relative to said gimbal base.

5. A security camera as claimed in claim 1 further comprising a cover for said base.

6. A security camera as claimed in claim 5 wherein said cover includes a clear transparent dome to protect said gimbal base, gimbal cover and camera module therewithin.

7. A security camera as claimed in claim 1 further comprising a surface mounting plate for mounting said security camera on a surface.

* * * * *